United States Patent
Liang et al.

(10) Patent No.: US 10,496,145 B2
(45) Date of Patent: Dec. 3, 2019

(54) PEAK POWER CONTROL AND SEQUENCING FOR MULTIPLE POWER SUPPLIES

(71) Applicant: INTEL CORPORATION, Santa Clara, CA (US)

(72) Inventors: Xiaoguo Liang, Shanghai (CN); Jun Zhang, Shanghai (CN); Xiang Zhou, Shanghai (CN); Hong W. Wong, Portland, OR (US); Alexander B. Uan-Zo-Li, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/111,890

(22) PCT Filed: Aug. 27, 2015

(86) PCT No.: PCT/CN2015/088253
§ 371 (c)(1),
(2) Date: Jul. 15, 2016

(87) PCT Pub. No.: WO2017/031752
PCT Pub. Date: Mar. 2, 2017

(65) Prior Publication Data
US 2018/0164862 A1    Jun. 14, 2018

(51) Int. Cl.
*G06F 1/32* (2019.01)
*G06F 1/26* (2006.01)
(Continued)

(52) U.S. Cl.
CPC ............... *G06F 1/263* (2013.01); *G06F 1/26* (2013.01); *G06F 1/28* (2013.01); *G06F 1/30* (2013.01); *G06F 1/3203* (2013.01)

(58) Field of Classification Search
CPC ............... G06F 1/263; G06F 1/26; G06F 1/28
(Continued)

(56) References Cited

U.S. PATENT DOCUMENTS

| | | | |
|---|---|---|---|
| 6,583,523 B1 * | 6/2003 | Bhate | H02J 1/10 307/48 |
| 2004/0061380 A1 * | 4/2004 | Hann | H02J 1/06 307/43 |

(Continued)

FOREIGN PATENT DOCUMENTS

| CN | 101471567 | * 12/2007 |
|---|---|---|
| CN | 101471567 A | 7/2009 |
| CN | 101515723 A | 8/2009 |

OTHER PUBLICATIONS

International Search Report and Written Opinion for International Patent No. PCT/CN2015/088253, dated May 23, 2016, 11 pages.

*Primary Examiner* — Volvick Derose
(74) *Attorney, Agent, or Firm* — Jordan IP Law, LLC

(57) ABSTRACT

Systems, apparatuses, and methods may include a first power source to output power at a first normal power level and a first peak power level and a second power source cooperating with the first power source to output power at a second normal power level and a second peak power level. A system peak power control unit may monitor workload power requirements and cause the first power source to output the first peak power level at a first time period and cause the second power source to output the second peak power level at a second time period, different from the first time period. The time periods may be contiguous or discontiguous.

23 Claims, 10 Drawing Sheets

(51) Int. Cl.
*G06F 1/28* (2006.01)
*G06F 1/3203* (2019.01)
*G06F 1/30* (2006.01)

(58) Field of Classification Search
USPC .......................................................... 713/330
See application file for complete search history.

(56) References Cited

U.S. PATENT DOCUMENTS

| | | | |
|---|---|---|---|
| 2005/0118472 A1* | 6/2005 | Yang | H01M 16/006 320/101 |
| 2006/0290205 A1* | 12/2006 | Heber | H02J 9/062 307/65 |
| 2009/0172453 A1* | 7/2009 | Dishman | G06F 1/263 713/340 |
| 2009/0249091 A1* | 10/2009 | Goodnow | G06F 1/263 713/310 |
| 2010/0283443 A1* | 11/2010 | Cyron | H02M 3/1584 323/284 |
| 2011/0025129 A1* | 2/2011 | Humphrey | G06F 1/263 307/64 |
| 2011/0055614 A1* | 3/2011 | Lin | G06F 1/263 713/340 |
| 2015/0357005 A1* | 12/2015 | Shim | G11C 5/141 365/228 |
| 2015/0380929 A1* | 12/2015 | Mitsutani | B60L 58/20 307/52 |
| 2016/0134108 A1* | 5/2016 | Hung | H02J 1/04 307/60 |
| 2017/0003727 A1* | 1/2017 | Fluman | G06F 1/3234 |

\* cited by examiner

PEAK POWER CONTROL AND SEQUENCING FOR MULTIPLE POWER SUPPLIES

CROSS-REFERENCE WITH RELATED APPLICATIONS

This application is a U.S. National Phase Patent Application which claims benefit to International Patent Application No. PCT/CN2015/088253 filed on Aug. 27, 2015.

TECHNICAL FIELD

Embodiments generally relate to power control. More particularly, embodiments relate to methods, apparatuses, and systems that control peak power for multiple power sources.

BACKGROUND

In operating computers and mobile devices, it may be desirable to use multiple power sources, which may be connected in parallel. Power sources may be designed with an average power output and a peak power output. The peak power output may be supplied when the demands of a workload, such as a CPU (central processing unit), temporarily require higher power. Turbo mode is an example of a CPU temporarily requiring higher power. Current power supplies may be able to meet the higher demand for power for a very brief period but may not be able to sustain peak power for a longer desired period.

BRIEF DESCRIPTION OF THE DRAWINGS

The various advantages of the embodiments will become apparent to one skilled in the art by reading the following specification and appended claims, and by referencing the following drawings, in which:

DETAILED DESCRIPTION

Figure 1:
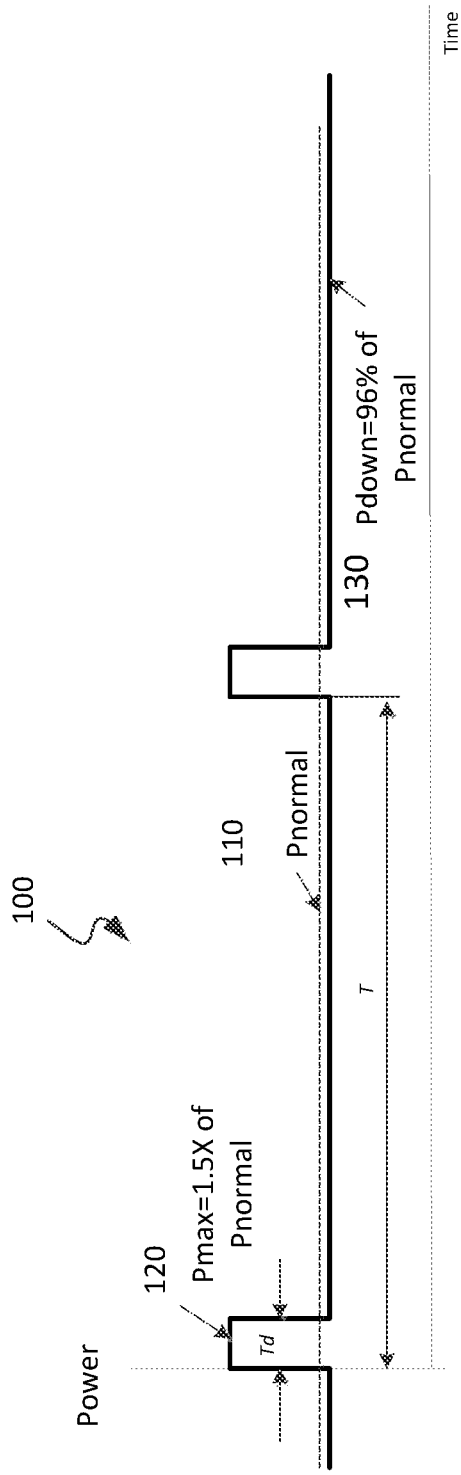
FIG. 1 is a graph of an exemplary power source at various power levels.

Turning now to FIG. 1, a graph 100 of power versus time for a power source is depicted. The power source, which may be a power supply unit (PSU), battery cell, battery pack or other similar power source, has normal power level $P_{normal}$ shown at 110, a maximum power $P_{max}$ (higher than Pnormal) shown at 120 and a lower power level (lower than Pnormal) $P_{down}$ at 130. For illustration only, in the example of FIG. 1, $P_{max}$ is 1.5 times the level of $P_{normal}$. The lower power level, $P_{down}$, shown at 130, may be 0.96 times the level of $P_{normal}$. These values of $P_{max}$ and $P_{down}$ versus $P_{normal}$ are used in the exemplary embodiments of FIGS. 2-6 for clarity of discussion only. In practice, however, the percentage amount that $P_{max}$ is above $P_{normal}$ and the percentage amount that $P_{down}$ is below $P_{normal}$ is not standard and is case by case according to the characteristic of each type of power source.

In a power cycle of period T, a short period of $T_d$ may supply power at the maximum level of $P_{max}$. For example, the period $T_d$ may be used to supply power to a workload in turbo mode. In an exemplary embodiment for a power supply unit, $P_{max}$ may be 1800 W, $P_{normal}$ may be 1200 watts and $P_{down}$ may be 1160 watts. An exemplary time period T is 50 ms with $T_d$ lasting 3 ms. As seen from the example of FIG. 1, the period for $P_{max}$ is relatively short compared to the period T. Thus, maximum power may only be supplied for a fraction of the total time a power source is in operation.

Figure 2:
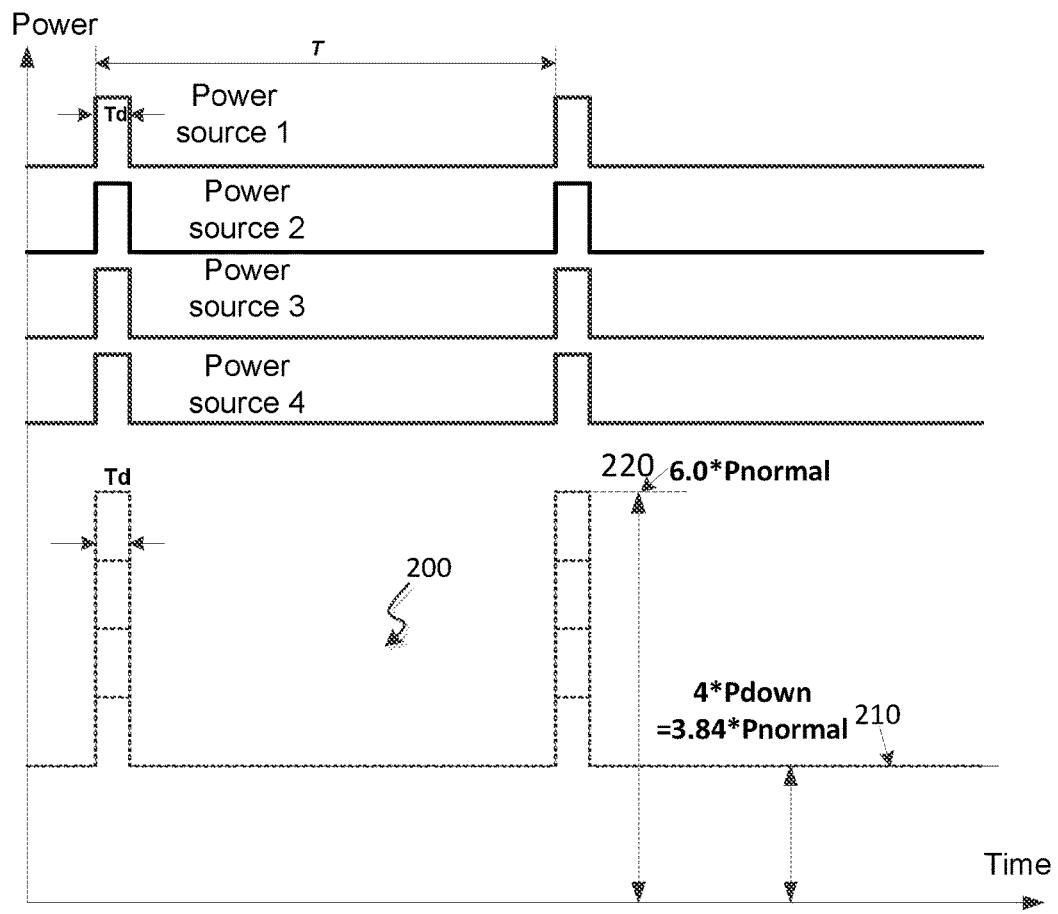
FIG. 2 is a graph of an example of four power sources in parallel with simultaneous peak level periods.

In FIG. 2, a graph 200 depicts the power output of four power sources connected in parallel. As seen in FIG. 2, the four power sources in parallel may increase each of the power levels supplied to a workload. In FIG. 2, element 210 depicts 4 times the level of $P_{down}$ for a single power source as the base level of power supplied to a workload. For the peak power level, each power source provides its peak power at the same time period, $T_d$, resulting in a total peak power level of $6.0*P_{normal}$ (for four power supplies) shown at 220. As a result, an extra $2.0*P_{normal}$ peak power could be supplied within a period of time $T_d$ by using 4 power source in parallel. As seen from the graph of FIG. 2, maximum power may only be supplied for the same fraction of the total time period T—for four power sources in parallel as for the single power source of FIG. 1.

Figure 3:
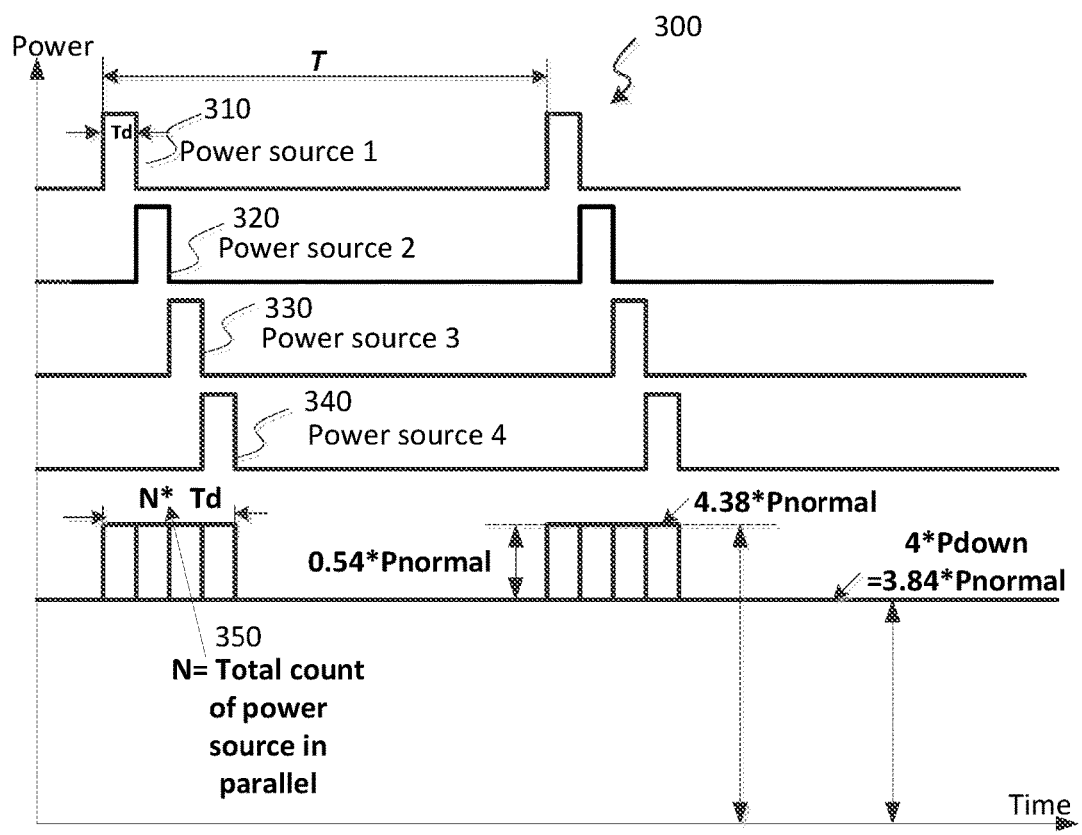
FIG. 3 is a graph of an example of four power sources in parallel with contiguous peak level periods according to an embodiment.

FIG. 3 depicts a graph 300 according to one embodiment in which four power sources in parallel are controlled such that a period of peak power level may be increased beyond that for a single power source. In FIG. 3, each of power sources 1, 2, 3, and 4 has a peak power period $T_d$, as seen at elements 310, 320, 330, and 340. The time slot for each peak power period 310, 320, 330, and 340 may be controlled such that each peak power period may occur at a different time slot. In the embodiment of FIG. 3, the time slots may be selected such that they are contiguous. Thus, the peak power period is extended from a period of $T_d$ to a period of $4*T_d$, depicted at element 350 in FIG. 3, where N is the number of power sources (N=4 in the example of FIG. 3). Although the peak power level, $4.38*P_{normal}$, during the contiguous time period may be less than in the simultaneous case of FIG. 2, such a peak power level may be sufficient to meet the peak power demands of a workload. Advantageously, if the number, N, of power sources is such that a condition of $N=T/T_d$ or $N>T/T_d$ is met, the combined power sources may continuously supply power at the higher peak power level. In this case, an extra 0.38 $P_{normal}$ peak power that could be supplied for an extended supplying time for peak power provides the flexibility to meet different workload power requirements.

Figure 4:
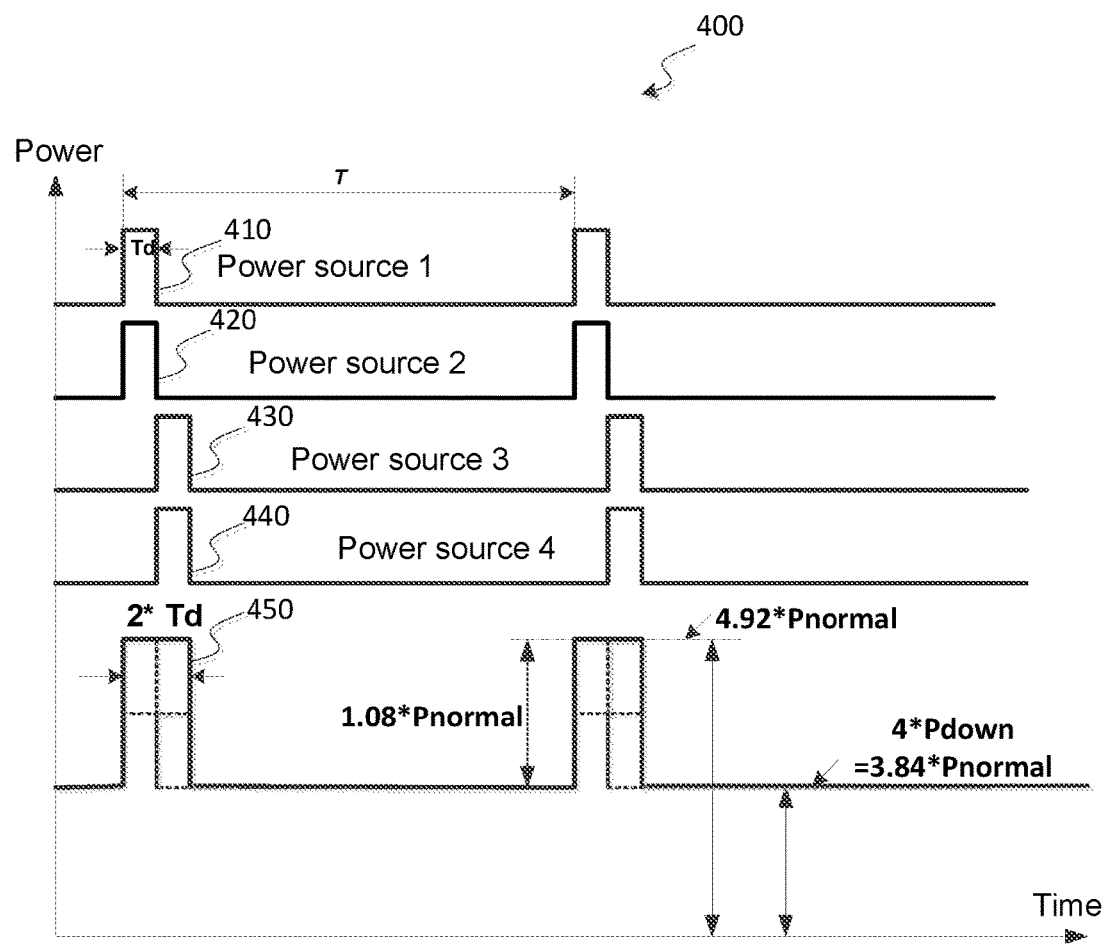
FIGS. 4 and 5 are graphs of examples of four power sources in parallel with contiguous and simultaneous peak level periods according to embodiments.
Figure 5:
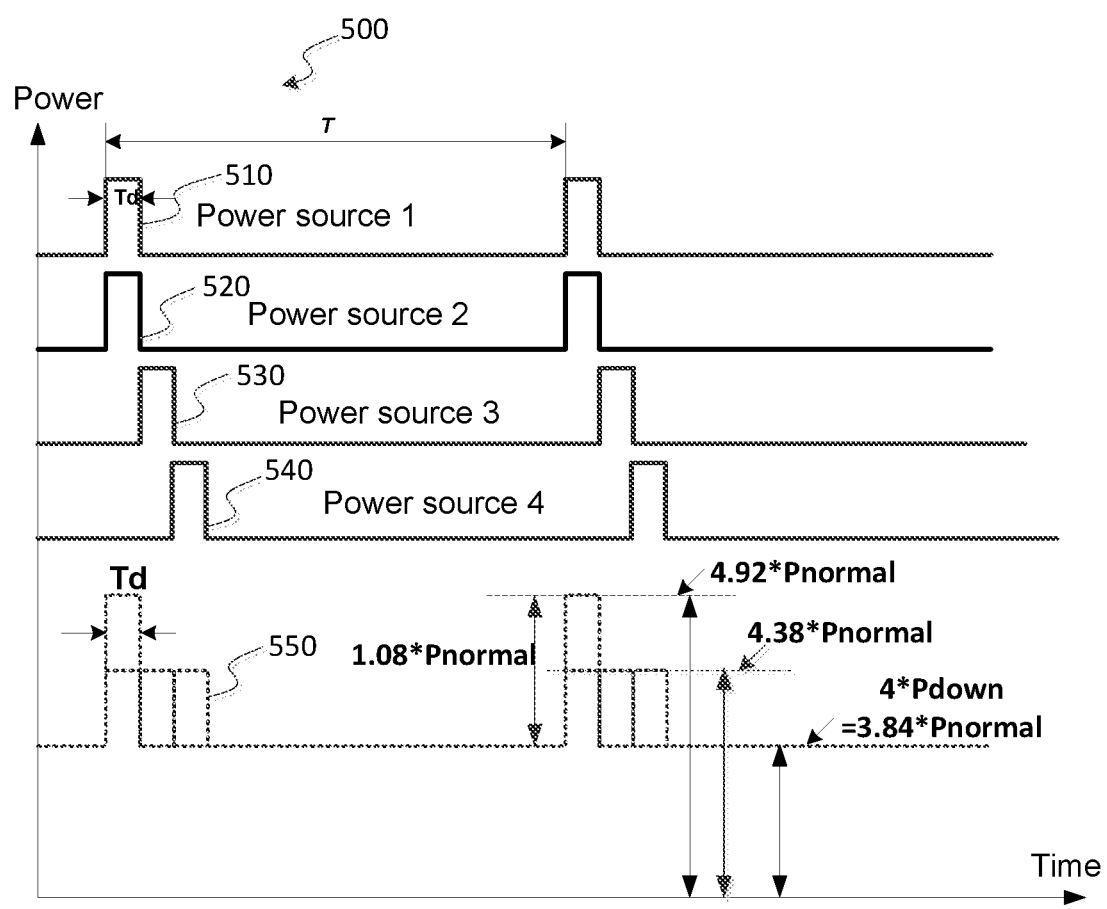

As seen in the embodiment of FIG. 4, the peak power period time slots of multiple power sources may be controlled in a variety of ways to increase the peak power level, to increase the peak power duration, or a combination of increasing the peak power level and the peak power duration. In graph 400, four power sources are combined in parallel. A peak power period $T_d$ 410 of power source 1 and a peak power period $T_d$ 420 of power source 2 are selected to occur simultaneously. Similarly, a peak power period $T_d$ 430 of power source 3 and a peak power period $T_d$ 440 of power source 4 are selected to occur simultaneously. In this manner, the composite peak power period is $2*T_d$ for the embodiment of FIG. 4 and the peak power level is $4.92*P_{normal}$. Such an embodiment may be used when desiring a higher peak power level for a shorter period than the embodiment of FIG. 3.

Note that the number of simultaneous peak power periods may be arbitrarily selected for the number of power sources to obtain a desired peak power output and that the peak power periods need not be the same across multiple time periods T. As seen in graph 500 of FIG. 5, the peak power period 510 of power source 1 and the peak power period 520 of power source 2 are selected to occur simultaneously while the peak power period 530 of power source 3 and the peak power period 540 of power source 4 each occur sequentially after the combined peak power period of power sources 1 and 2. The composite peak power profile is depicted as element 550 in FIG. 5. In this manner, a portion of the composite peak power period is at a power level $4.92*P_{normal}$ and a portion of the composite peak power period is at a power level of $4.38*P_{normal}$.

Figure 6:
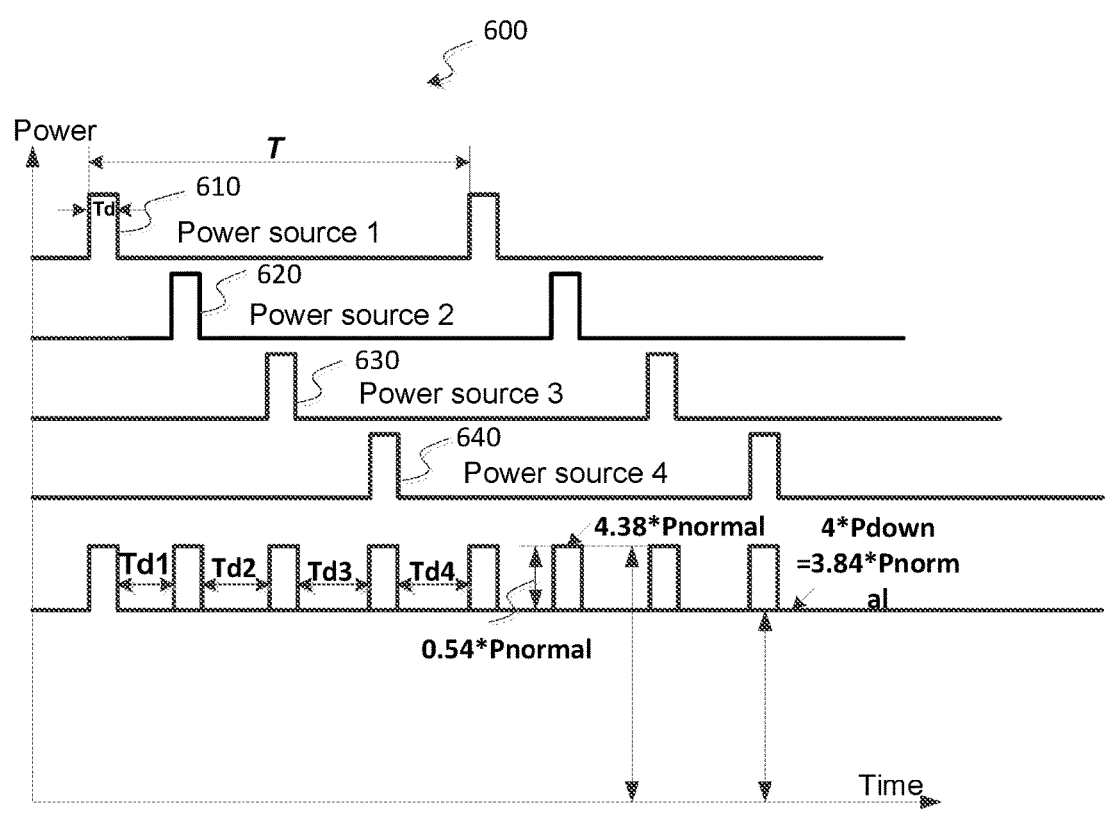
FIG. 6 is a graph of an example of four power sources in parallel with discontiguous peak level periods according to an embodiment.

In the embodiment of FIG. 6, graph 600 depicts a composite peak power profile with discontiguous peak power periods. In FIG. 6, a peak power period 610 of power source 1, a peak power period 620 of power source 2, a peak power period 630 of power source 3 and a peak power period 640 of power source 4 may each be selected to occur at a different time throughout period T. The time period between each occurrence of a peak power period, that is, $T_{d1}$, $T_{d2}$, $T_{d3}$, and $T_{d4}$, may be the same or different. Each peak power period has a level of $4.38*P_{normal}$ since each peak power period is powered only by a single source. This embodiment may be modified, however, to have some discontiguous peak power periods powered by multiple power sources, as in the embodiment of FIG. 5.

Figure 7:
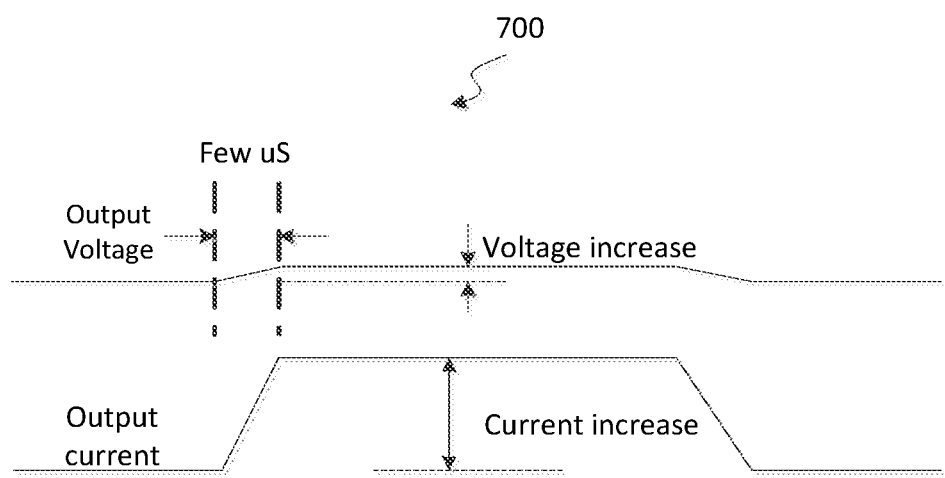
FIG. 7 is a graph depicting an example of a change in power levels.

FIG. 7 depicts a voltage and current vs. time plot 700 for an exemplary power source, which may be a power supply unit, battery cell, battery pack or other similar power source. In multiple power source parallel operation, each individual power source may sense and change its own output current (directly proportional to output power) by regulating its own voltage a small amount upon the peak power requirement command. As seen in FIG. 7, a rapid voltage level change may use only 6 microseconds to achieve the difference between a peak power level and a normal power level. Such a power supply unit may be used with any of the embodiments of FIGS. 3-6 as one of the power sources to achieve rapid switching between peak power levels and normal power levels. Typically, the regulation of the output voltage change is very minor, say, only less than few tens of mV, so that overall output voltage of a power source could be still considered as constant during this switching between peak power and normal power. This is also the reason that changing an output current may be equivalent to changing output power for the power source. As seen in FIG. 7, a much larger increase in output current occurs than does a change in output voltage.

Figure 8:
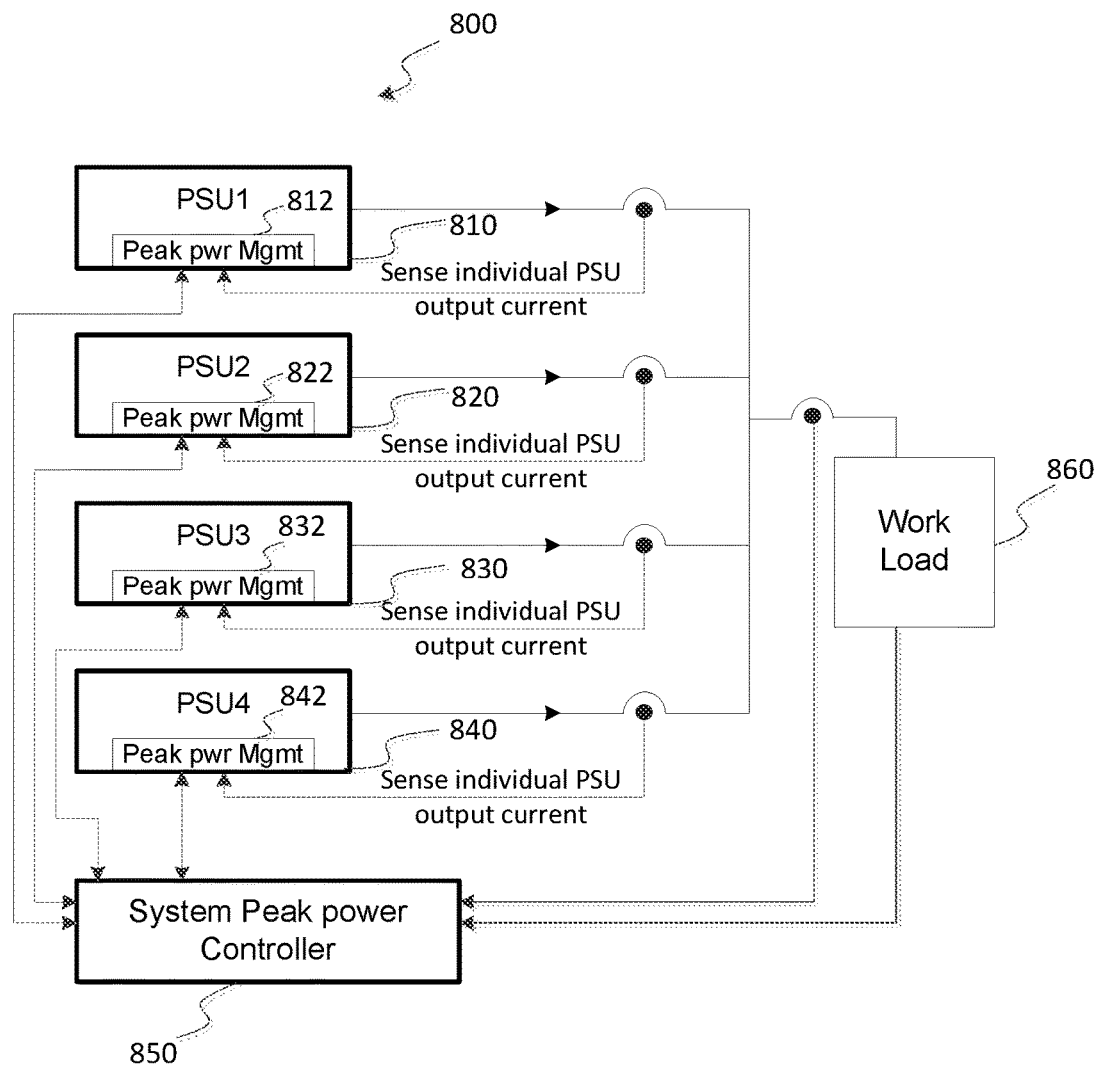
FIG. 8 is a block diagram of an example of a system to conduct peak power level control according to an embodiment.

FIG. 8 depicts a system 800 that may be used in the embodiments of FIGS. 3-6. Although four power sources, 810, 820, 830, and 840 are depicted, an arbitrary number of power sources may be used, as discussed above. Within each power source is a peak power manager 812, 822, 832, and 842, respectively. A system peak power controller 850 may communicate with each power source peak power manager 812, 822, 832, and 842 and also may communicate with a workload 860. Examples of the workload 860 include, for example, one or more computers, one or more servers, etc. The system peak power controller 850 may monitor the workload 860 to determine the required peak power levels and the required duration of peak power. The system peak power controller 850 may send peak power commands to one or more of the power sources 810, 820, 830, and/or 840 to output peak power at a certain time slot in accordance with the scenarios presented in FIGS. 3-6. Each of the peak power managers 812, 822, 832, and 842 may rapidly sense and change its own output current by regulating its output voltage a small amount to supply peak power upon instruction from the system peak power controller 850. Note that the system peak power controller 850 may also monitor the output current of the power system (here, the four power sources connected in parallel). In one embodiment, each power source 810, 820, 830, and 840 may be a power supply unit, battery cell, battery pack or other similar power source.

Figure 9:
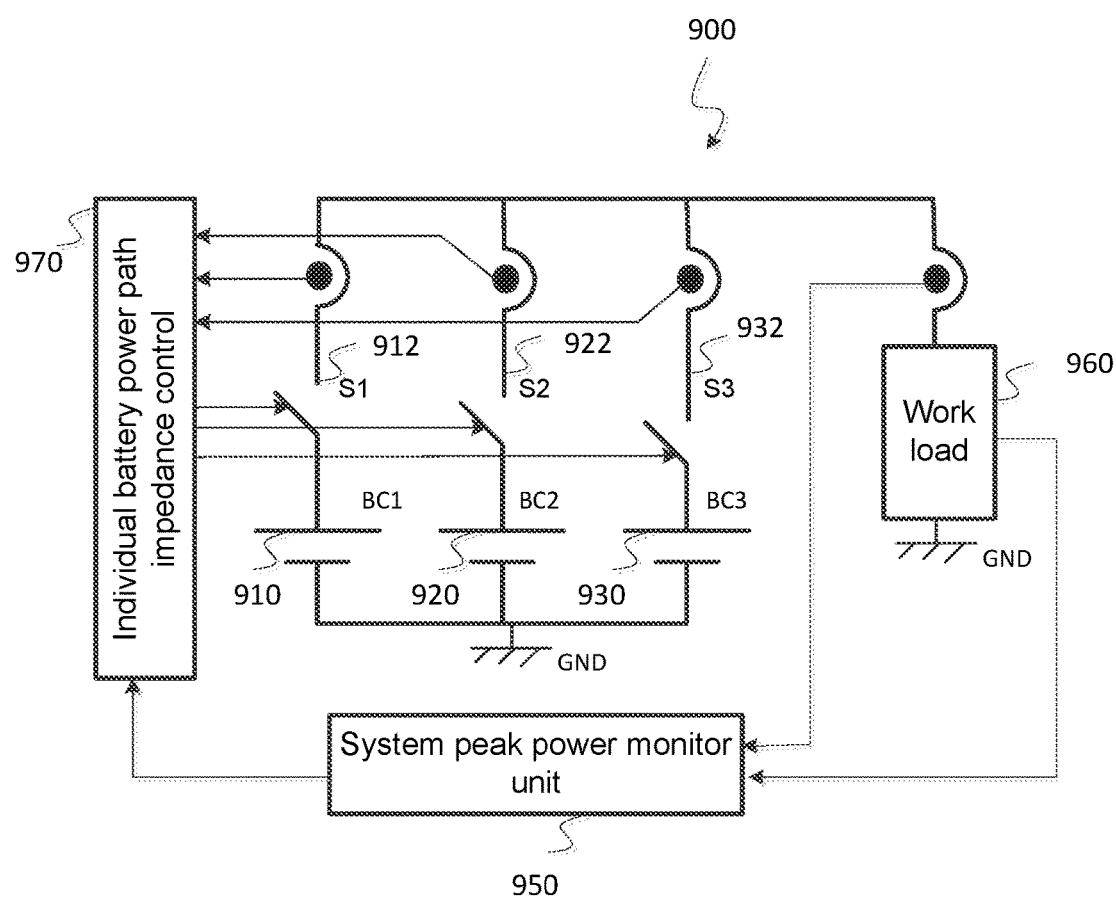
FIG. 9 is a block diagram of an example of a further system to conduct peak power level control according to an embodiment.

FIG. 9 depicts a system 900 using multiple passive power sources such as individual battery cells 910, 920, and 930. The output current of each individual battery cell may be sensed and regulated by individual battery power path impedance control 970 switches 912, 922, and/or 932 may be open or closed or operated in a linear mode by an impedance controller 970 to equivalently adjust the impedance of each battery cell power path in order to control the output current for peak power. Typically, the impedance over a power pathway is small (on the order of mOhm) so the minor voltage drop across the switches may only bring a minor power loss. The illustrated system peak power monitor 950 determines when peak power is needed through communication with workload 960. The system peak power monitor 960 may also monitor system output current of the battery cells connected in parallel.

Figure 10:
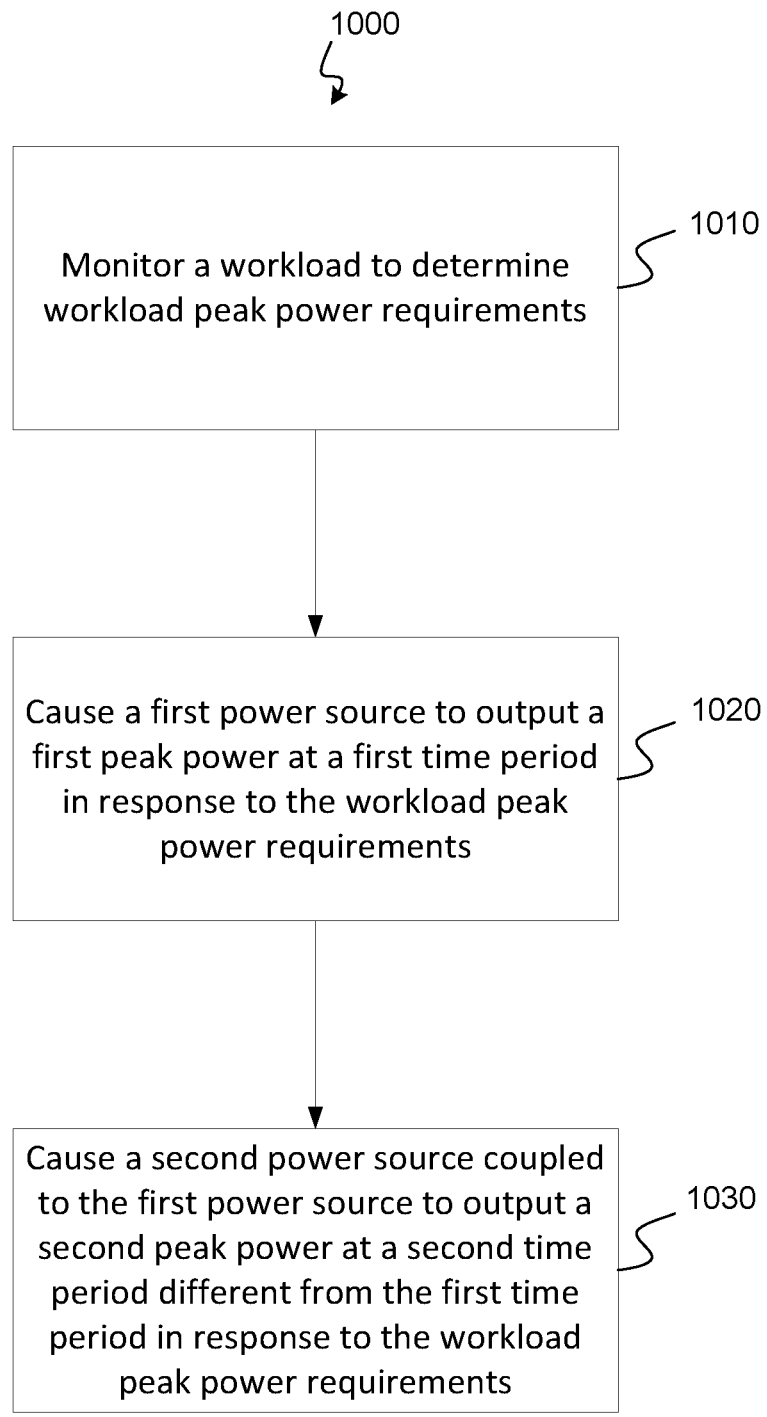
FIG. 10 is a flowchart of an example of a method according to an embodiment.

In use, the system 800 of FIG. 8 or the system 900 of FIG. 9 may perform a method 1000 depicted in FIG. 10. With continuing reference to FIGS. 8 and 9, the method 1000 may be implemented as one or more modules in a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof. At illustrated block 1010, the system 800 or 900 monitors a workload to determine workload peak power requirements. At illustrated block 1020, the system 800 or 900 causes a first power source to output a first peak power at a first time period in response to the workload peak power requirements. At illustrated block 1030, the system 800 or 900 causes a second power source coupled to the first power source to output a second peak power at a second time period different from the first time period in response to the workload peak power requirements.

ADDITIONAL NOTES AND EXAMPLES

Example 1 may include a peak power control system comprising a first power source to output power at a first normal power level and a first peak power level, a second power source cooperating with the first power source to output power at a second normal power level and a second peak power level, a workload coupled to the first power source and the second power source, and a system peak power controller to monitor workload power requirements and cause the first power source to output the first peak power level at a first time period and cause the second power source to output the second peak power level at a second time period, different from the first time period.

Example 2 may include the peak power control system of example 1 wherein the first time period is contiguous to the second time period.

Example 3 may include the peak power control system of examples 1 or 2 wherein the first power source and the second power source are connected in parallel.

Example 4 may include the peak power control system of examples 1 or 2 further comprising additional power sources connected in parallel with the first and second power sources such that peak power is continuously supplied to the workload.

Example 5 may include the peak power control system of examples 1 or 2 wherein the first power source is a first power supply unit and the second power source is a second power supply unit.

Example 6 may include the peak power control system of examples 1 or 2 wherein the first power source is a first battery cell and the second power source is a second battery cell and further comprising switches between the first battery cell and the workload and between the second battery cell and the workload.

Example 7 may include a peak power control apparatus comprising a first power source to output power at a first normal power level and a first peak power level, a second power source cooperating with the first power source to output power at a second normal power level and a second peak power level, and a system peak power controller to monitor workload power requirements and cause the first power source to output the first peak power level at a first time period and cause the second power source to output the second peak power level at a second time period, different from the first time period.

Example 8 may include the peak power control apparatus of example 7 wherein the first time period is contiguous to the second time period.

Example 9 may include the peak power control apparatus of examples 7 or 8 wherein the first power source and the second power source are connected in parallel.

Example 10 may include the peak power control apparatus of examples 7 or 8 further comprising additional power sources connected in parallel with the first and second power sources such that peak power is continuously supplied to the workload.

Example 11 may include the peak power control apparatus of examples 7 or 8 wherein the first power source is a first power supply unit and the second power source is a second power supply unit.

Example 12 may include the peak power control apparatus of examples 7 or 8 wherein the first power source is a first battery cell and the second power source is a second battery cell and further comprising switches between the first battery cell and the workload and between the second battery cell and the workload.

Example 13 may include a peak power control method comprising monitoring a workload to determine workload power peak power requirements, causing a first power source to output a first peak power at a first time period in response to the workload peak power requirements, and causing a second power source coupled to the first power source to output a second peak power at a second time period different from the first time period in response to the workload peak power requirements.

Example 14 may include the peak power control method of example 13 wherein the first time period is contiguous to the second time period.

Example 15 may include the peak power control method of examples 13 or 14 wherein the first power source and the second power source are connected in parallel.

Example 16 may include the peak power control method of examples 13 or 14 further comprising additional power sources connected in parallel with the first and second power sources such that peak power is continuously supplied to a workload.

Example 17 may include the peak power control method of examples 13 or 14 wherein the first power source is a first power supply unit and the second power source is a second power supply unit.

Example 18 may include the peak power control method of examples 13 or 14 wherein the first power source is a first battery cell and the second power source is a second battery cell and further comprising switching between the first battery cell and the workload and between the second battery cell and the workload.

Example 19 may include at least one computer readable storage medium comprising a set of instructions which, when executed by a computing device, cause the computing device to monitor a workload to determine workload power peak power requirements, cause a first power source to output a first peak power at a first time period in response to the workload peak power requirements, and cause a second power source coupled to the first power source to output a second peak power at a second time period different from the first time period in response to the workload peak power requirements.

Example 20 may include the at least one computer readable storage medium of example 19 wherein the first time period is contiguous to the second time period.

Example 21 may include the at least one computer readable storage medium of examples 19 or 20 wherein the first power source and the second power source are connected in parallel.

Example 22 may include the at least one computer readable storage medium of examples 19 or 20 wherein the instructions, when executed, cause peak power to be continuously supplied to a workload.

Example 23 may include the at least one computer readable storage medium of examples 19 or 20 wherein instructions, when executed, cause switching between the first power source and the workload and between the second power source and the workload.

Example 24 may include a peak power control apparatus comprising means for monitoring a workload to determine workload power peak power requirements, means for causing a first power source to output a first peak power at a first time period in response to the workload peak power requirements, and means for causing a second power source coupled to the first power source to output a second peak power at a second time period different from the first time period in response to the workload peak power requirements.

Example 25 may include the peak power control apparatus of example 24 wherein the first time period is contiguous to the second time period.

Example 26 may include the peak power control apparatus of examples 24 or 25 wherein the first power source and the second power source are connected in parallel.

Example 27 may include the peak power control apparatus of examples 24 or 25 further comprising additional power sources connected in parallel with the first and second power sources such that peak power is continuously supplied to a workload.

Example 28 may include the peak power control apparatus of examples 24 or 25 wherein the first power source is a first power supply unit and the second power source is a second power supply unit.

Example 29 may include the peak power control apparatus of examples 24 or 25 wherein the first power source is a first battery cell and the second power source is a second battery cell and further comprising switching between the first battery cell and the workload and between the second battery cell and the workload.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A, B, C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A system comprising:
   a first power source to output power at a first normal power level, a first peak power level that is greater than the first normal power level, and a first low power level that is less than the first normal power level and is greater than zero;
   a second power source cooperating with the first power source to output power at a second normal power level, a second peak power level that is greater than the second normal power level, and a second low power level that is less than the second normal power level and is greater than zero;
   a workload coupled to the first power source and the second power source; and
   a system peak power control unit to:
     monitor workload power requirement,
     cause, at a first time period, the first power source to output the first peak power level and the second power source to output one or more of the second normal power level or the second low power level, and
     cause, at a second time period different from the first time period, the second power source to output the second peak power level and the first power source to output one or more of the first normal power level or the first low power level.

2. The system of claim 1, wherein the first time period is contiguous to the second time period.

3. The system of claim 1, wherein the first power source and the second power source are connected in parallel.

4. The system of claim 1, further comprising additional power supplies connected in parallel with the first and second power sources such that peak power is continuously supplied to the workload.

5. The system of claim 1, wherein the first power source is a first power supply unit and the second power source is a second power supply unit.

6. The system of claim 1, wherein the first power source is a first battery cell and the second power source is a second battery cell and further comprising switches between the first battery cell and the workload and between the second battery cell and the workload.

7. An apparatus comprising:
   a first power source to output power at a first normal power level, a first peak power level that is greater than the first normal power level, and a first low power level that is less than the first normal power level and is greater than zero;
   a second power source cooperating with the first power source to output power at a second normal power level, a second peak power level that is greater than the second normal power level, and a second low power level that is less than the second normal power level and is greater than zero; and a system peak power control unit to:
monitor workload power requirements,
cause, at a first time period, the first power source to output the first peak power level and the second power source to output one or more of the second normal power level or the second low power level, and
cause, at a second time period different from the first time period, the second power source to output the second peak power level and the first power source to output one or more of the first normal power level or the first low power level.

8. The apparatus of claim 7, wherein the first time period is contiguous to the second time period.

9. The apparatus of claim 7, wherein the first power source and the second power source are connected in parallel.

10. The apparatus of claim 7, further comprising additional power supplies connected in parallel with the first and second power sources such that peak power is continuously supplied to a workload.

11. The apparatus of claim 7, wherein the first power source is a first power supply unit and the second power source is a second power supply unit.

12. The apparatus of claim 7, wherein the first power source is a first battery cell and the second power source is a second battery cell and further comprising switches between the first battery cell and a workload and between the second battery cell and the workload.

13. A method comprising:
monitoring a workload to determine workload peak power requirements;
causing, at a first time period in response to the workload peak power requirements, a first power source to output power at a first peak power level, and a second power source coupled to the first power source to output power at one or more of a second normal power level or a second low power level; and
causing, at a second time period different from the first time period in response to the workload peak power requirements, the second power source to output power at a second peak power level, and the first power source to output power at one or more of a first normal power level or a first low power level,
wherein the first peak power level is greater than the first normal power level, and the first low power level is less than the first normal power level and is greater than zero, and
further wherein the second peak power level is greater than the second normal power level, and the second low power level is less than the second normal power level and is greater than zero.

14. The method of claim 13, wherein the first time period is contiguous to the second time period.

15. The method of claim 13, wherein the first power source and the second power source are connected in parallel.

16. The method of claim 13, further comprising additional power supplies connected in parallel with the first and second power sources such that peak power is continuously supplied to the workload.

17. The method of claim 13, wherein the first power source is a first power supply unit and the second power source is a second power supply unit.

18. The method of claim 13, wherein the first power source is a first battery cell and the second power source is a second battery cell and further comprising switching between the first battery cell and the workload and between the second battery cell and the workload.

19. At least one non-transitory computer readable storage medium comprising a set of instructions which, when executed by a computing device, cause the computing device to:
monitor a workload to determine workload peak power requirements;
cause, at a first time period in response to the workload peak power requirements, a first power source to output power at a first peak power level, and a second power source coupled to the first power source to output power at one or more of a second normal power level or a second low power level; and
cause, at a second time period different from the first time period in response to the workload peak power requirements, the second power source to output power at a second peak power level and the first power source to output power at one or more of a first normal power level or a first low power level,
wherein the first peak power level is greater than the first normal power level, and the first low power level is less than the first normal power level and is greater than zero, and
further wherein the second peak power level is greater than the second normal power level, and the second low power level is less than the second normal power level and is greater than zero.

20. The at least one non-transitory computer readable storage medium of claim 19, wherein the first time period is contiguous to the second time period.

21. The at least one non-transitory computer readable storage medium of claim 19, wherein the first power source and the second power source are connected in parallel.

22. The at least one non-transitory computer readable storage medium of claim 19, wherein the instructions, when executed, cause peak power to be continuously supplied to the workload.

23. The at least one non-transitory computer readable storage medium of claim 19, wherein instructions, when executed, cause switching between the first power source and the workload and between the second power source and the workload.

* * * * *